(12) United States Patent
Seubert et al.

(10) Patent No.: US 10,114,156 B2
(45) Date of Patent: Oct. 30, 2018

(54) VEHICLE COMPONENTS UTILIZING INFRARED REFLECTIVE DETECTABLE LAYER AND INFRARED TRANSMISSIVE DECORATIVE LAYER

(71) Applicant: Ford Global Technologies, LLC, Dearborn, MI (US)

(72) Inventors: Christopher Michael Seubert, New Hudson, MI (US); Mark Edward Nichols, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 15/361,773

(22) Filed: Nov. 28, 2016

(65) Prior Publication Data

US 2018/0149782 A1     May 31, 2018

(51) Int. Cl.
*G02B 5/20* (2006.01)
*B60R 11/04* (2006.01)
*B60R 13/04* (2006.01)
*F21K 2/00* (2006.01)
*C09D 5/33* (2006.01)
*G01S 7/481* (2006.01)
*G01S 17/93* (2006.01)

(52) U.S. Cl.
CPC .............. *G02B 5/208* (2013.01); *B60R 11/04* (2013.01); *B60R 13/04* (2013.01); *C09D 5/004* (2013.01); *F21K 2/005* (2013.01); *G01S 7/481* (2013.01); *G01S 17/936* (2013.01)

(58) Field of Classification Search
CPC .......... G02B 1/10; G02B 1/113; G02B 1/115; G02B 1/14; G02B 5/20; G02B 5/206; G02B 5/208; G02B 5/22; G02B 5/26; G02B 5/28

USPC ................................. 359/350, 359, 360, 361
See application file for complete search history.

(56) References Cited

U.S. PATENT DOCUMENTS

| | | | |
|---|---|---|---|
| 4,916,014 A | | 4/1990 | Weber et al. |
| 5,734,343 A | * | 3/1998 | Urbish ............. G06K 19/06009 340/556 |
| 6,997,981 B1 | | 2/2006 | Coombs et al. |
| 7,244,049 B2 | | 7/2007 | Suzuki |
| 7,709,095 B2 | | 5/2010 | Persoone et al. |
| 8,357,448 B2 | * | 1/2013 | O'Keefe ................... B32B 7/06 359/360 |
| 9,096,442 B2 | | 8/2015 | White et al. |
| 2003/0016368 A1 | | 1/2003 | Aman et al. |
| 2004/0032658 A1 | | 2/2004 | Fleming |
| 2007/0008735 A1 | | 1/2007 | Harter, Jr. et al. |

(Continued)

FOREIGN PATENT DOCUMENTS

| | | |
|---|---|---|
| DE | 10044375 B4 | 6/2006 |
| DE | 1020013216946 A1 | 6/2014 |

*Primary Examiner* — Arnel C Lavarias
(74) *Attorney, Agent, or Firm* — Jason Rogers; Price Heneveld LLP

(57) ABSTRACT

A vehicle body panel includes a substrate defining an exterior surface. A detectable layer is positioned on the exterior surface and is configured to interact with a first band of an electromagnetic spectrum. A decorative layer is positioned on the detectable layer and is configured to reflect a portion of a second band of the electromagnetic spectrum and transmit the first portion of the electromagnetic spectrum. A top layer is positioned on the decorative layer and is configured to transmit the first and second band of the electromagnetic spectrum.

16 Claims, 5 Drawing Sheets

(56) References Cited

U.S. PATENT DOCUMENTS

| | | |
|---|---|---|
| 2008/0107841 A1 | 5/2008 | Remillard et al. |
| 2008/0187708 A1 | 8/2008 | Decker et al. |
| 2009/0193694 A1 | 8/2009 | Cordell et al. |
| 2009/0233121 A1 | 9/2009 | Leconte |
| 2010/0151213 A1 | 6/2010 | Smithson et al. |
| 2010/0237299 A1* | 9/2010 | Yamanaka ............... B05D 5/00 252/587 |
| 2011/0041726 A1 | 2/2011 | Robb et al. |
| 2012/0009416 A1 | 1/2012 | Lai et al. |
| 2013/0015977 A1 | 1/2013 | Scott |
| 2014/0131990 A1 | 5/2014 | Zolotukhin |
| 2014/0185155 A1 | 7/2014 | Lee et al. |
| 2014/0285889 A1 | 9/2014 | Smithson et al. |
| 2015/0167917 A1 | 6/2015 | Takahashi et al. |
| 2015/0247040 A1 | 9/2015 | Henglein et al. |
| 2015/0323149 A1 | 11/2015 | Salter et al. |
| 2016/0017151 A1 | 1/2016 | Protzmann et al. |
| 2016/0132705 A1 | 5/2016 | Kovarik et al. |
| 2016/0146926 A1 | 5/2016 | Jungwirth |

\* cited by examiner

VEHICLE COMPONENTS UTILIZING INFRARED REFLECTIVE DETECTABLE LAYER AND INFRARED TRANSMISSIVE DECORATIVE LAYER

FIELD OF THE INVENTION

The present disclosure generally relates to detectable layers, and more particularly, to vehicle components having infrared and near-infrared detectable layers.

BACKGROUND OF THE INVENTION

Autonomous vehicles sense the world around them using a variety of sensors. One such sensor may include a light detection and ranging (LIDAR) system that measures distance by illuminating a target with laser light. Such laser light may exist in the near-infrared and/or infrared wavelength band of the electromagnetic spectrum. In instances where the intended target has a high absorption, or low reflectance, of the wavelength used by the LIDAR system, detection of targets may prove difficult due to the lack of returned light from the target.

SUMMARY OF THE INVENTION

According to one aspect of the present disclosure, a vehicle body panel includes a substrate defining an exterior surface. A detectable layer is positioned on the exterior surface and is configured to interact with a first band of an electromagnetic spectrum. A decorative layer is positioned on the detectable layer and is configured to reflect a portion of a second band of the electromagnetic spectrum and transmit the first portion of the electromagnetic spectrum. A top layer is positioned on the decorative layer and is configured to transmit the first and second bands of the electromagnetic spectrum.

According to another aspect of the present disclosure, a vehicle body panel includes a substrate. A detectable layer is positioned on the substrate and is configured to reflect a band of an electromagnetic spectrum. A decorative layer includes a pigment and is positioned on the detectable layer. The decorative layer and the pigment are configured to transmit the band of the electromagnetic spectrum.

According to yet another aspect of the present disclosure, a vehicle includes a substrate. A detectable layer is configured as an indicium and is positioned on the substrate. The detectable layer is configured to reflect a non-visible band of the electromagnetic spectrum. A decorative layer is positioned over the detectable layer and is configured to transmit the non-visible band of the electromagnetic spectrum.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION OF THE PREFERRED EMBODIMENTS

Figure 1:
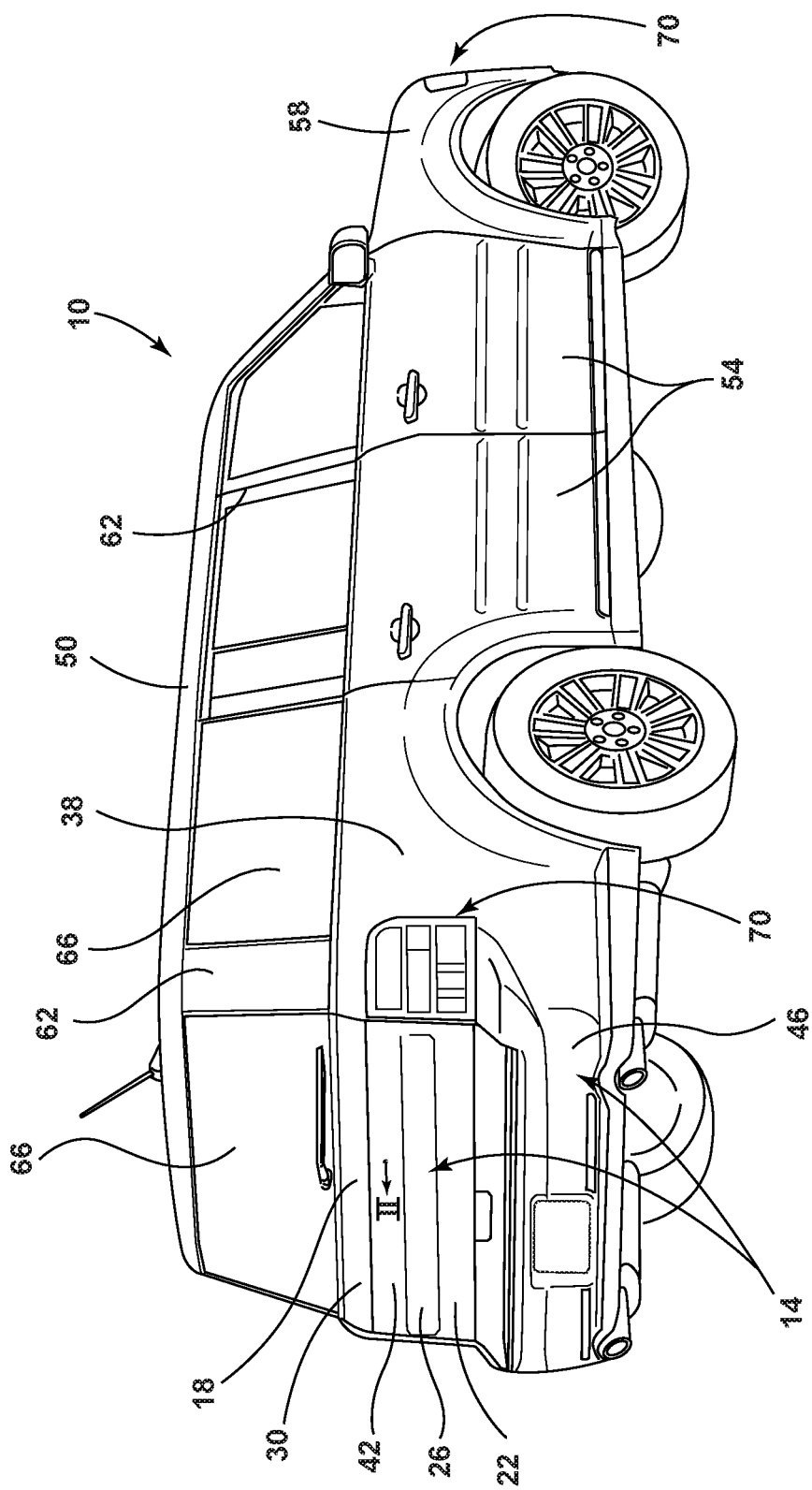
FIG. 1 is a rear-perspective view of a vehicle including a plurality of body panels, according to one example.

For purposes of description herein, the terms "upper," "lower," "right," "left," "rear," "front," "vertical," "horizontal," and derivatives thereof, shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring now to FIGS. 1-4B, reference numeral 10 generally designates a vehicle. The vehicle 10 includes a plurality of body panels 14 positioned around an exterior of the vehicle 10. Each of the body panels 14 may include a substrate 18 which defines an interior surface 18A and an exterior surface 18B. It will be understood that the interior surface 18A may be an inboard surface generally pointing towards an interior of the vehicle 10 and the exterior surface 18B may be an outboard surface generally facing outward from the vehicle 10. Positioned on the exterior surface 18B of the substrate 18 is a detectable layer 22. It will be understood that the detectable layer 22 may additionally or alternatively be positioned on the interior surface 18A of the substrate 18. According to various examples, the detectable layer 22 may be configured to interact (e.g., reflect, fluoresce in response to, absorb and/or transmit) with one or more bands of an electromagnetic spectrum. A decorative layer 26 is positioned on the detectable layer 22. According to various examples, the decorative layer 26 is configured to interact (e.g., reflect, fluoresce in response to, absorb and/or transmit) one or more bands of the electromagnetic spectrum. A top layer 30 is positioned over the decorative layer 26. The top layer 30 may be configured to interact (e.g., reflect, fluoresce in response to, absorb and/or transmit) with one or more bands of the electromagnetic spectrum.

Referring now to FIG. 1, the vehicle 10 in the depicted example is a car, but it will be understood that the disclosure may equally be applied to trucks, vans, motorcycles, construction equipment and the like without departing from the teachings provided herein. As explained above, the vehicle 10 includes a plurality of body panels 14 positioned around the exterior of the vehicle 10. It will be understood that although described in connection with exterior components, the description provided below may equally be applied to interior components (e.g., trim components, fascia, etc.). Examples of the body panels 14 of the vehicle 10 may include rear quarter panels 38, a lift gate 42, bumpers 46, a roof 50, doors 54, front quarter panels 58, pillars 62, as well as other body panels 14 positioned around the vehicle 10. It will be understood that this disclosure may also apply to transparencies around the vehicle 10 such as windows 66 and light assemblies 70. Further, the disclosure may equally be applied to license plates, stickers, or appliques positioned on the vehicle 10.

Figure 2:
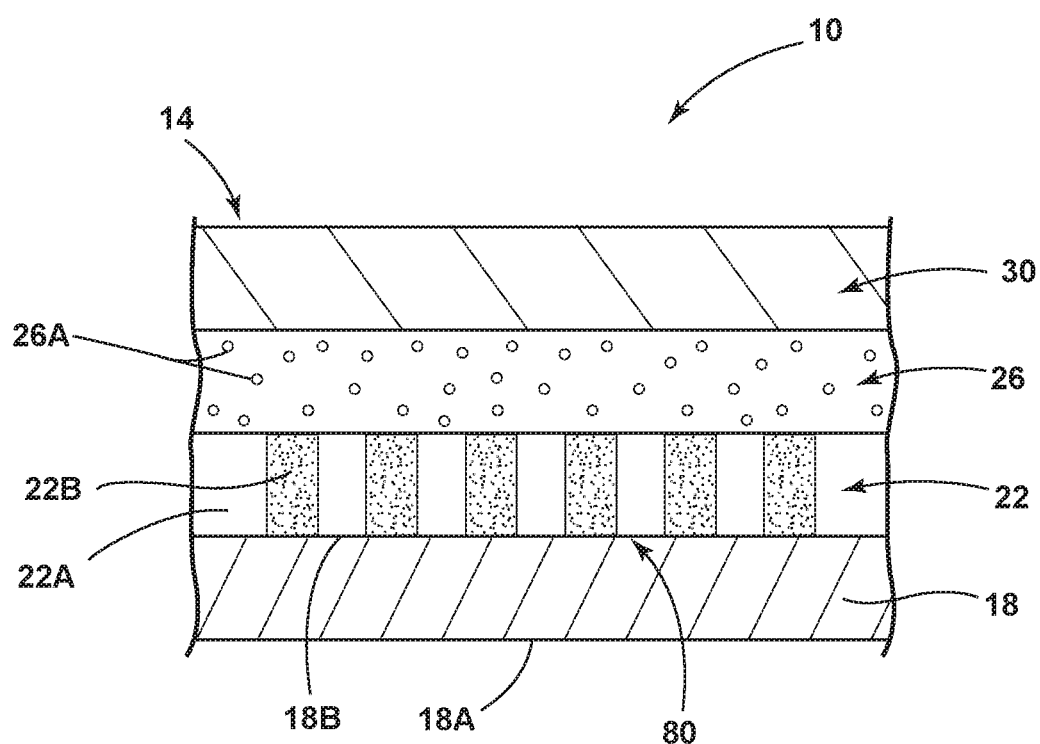
FIG. 2 is a cross-sectional view taken at line II of FIG. 1.

Referring now to FIG. 2, the body panels 14 have a layered structure including the substrate 18, the detectable layer 22 positioned on the exterior surface 18A of the substrate 18, the decorative layer 26 positioned on top of the detectable layer 22 and the top layer 30 positioned on top of the decorative layer 26. It will be understood that other orders of the layers 22, 26, 30 may be implemented without departing from the disclosure provided herein.

The top layer 30 may be configured to interact (e.g., reflect, fluoresce in response to, absorb and/or transmit) one or more bands of the electromagnetic spectrum. According to various examples, the top layer 30 may be configured to transmit greater than about 10%, 20%, 30%, 40%, 50%, 60%, 70%, 80%, 90%, or greater than about 99% of the visible, near-infrared, and/or infrared bands of the electromagnetic spectrum. According to various examples, the top layer 30 may be known as, and configured to function as, a "clear coat" for the body panel 14. The top layer 30 may provide protection from physical, chemical and/or environmental damage which the body panel 14 may be exposed to. The top layer 30 may be composed of a polymeric binder including one or more resins. The composition of the top layer 30 can further include one or more additives including, but not limited to, stabilizers (e.g., hindered amine light stabilizers or ultraviolet light absorbers), rheology control additives, flow control additives and other additives to achieve certain appearance and/or durability characteristics. Non-limiting examples of top layer 30 compositions that are suitable include thermally cured one-component solvent-borne clear coats, such as acrylic-melamine clear coats, epoxy-acid clear coats, polyester clear coats, alkyd clear coats and/or combinations thereof. In another example, the top layer 30 composition may include thermally cured two-component solvent-borne clear coats such as polyurethane clear coats, epoxy-acid clear coats, epoxy-thiol clear coats, thiourethane clear coats and/or combinations thereof. In another example, the top layer 30 composition may include radiation cured solvent-borne clear coats such as urethane acrylate clear coats, epoxy acrylate clear coats, thiourethane clear coats, epoxy-acid clear coats, urethane clear coats, ester-acrylate clear coats and/or combinations thereof. In another example, the top layer 30 composition may include thermally cured powder clear coats such as epoxy clear coats, polyester clear coats, acrylic clear coats, urethane clear coats and/or combinations thereof. In another example, the top layer 30 composition may include and thermally cured water-borne clear coats, such as polyurethane clear coats. It will be understood that any of the disclosed compositions for the top layer 30 may be utilized (e.g., mixed, layered, etc.) with any other compositions disclosed for the top layer 30.

The decorative layer 26 is positioned below the top layer 30. The top layer 30 may cover all or a portion of the decorative layer 26. One or more adhesion layers may be positioned between the top layer 30 and the decorative layer 26 to facilitate or increase adhesion between the layers 30, 26. The decorative layer 26 may have a thickness of between about 10 μm and about 30 μm. The decorative layer 26 may be referred to as a "base coat" and/or a "paint." In examples where the decorative layer 26 is a paint or base coat, the decorative layer 26 may include additives 26A such as pigments, particles, flakes or other additives which may provide a desired appearance to the decorative layer 26. The decorative layer 26 may provide aesthetically pleasing color and effects by reflecting and/or scattering at least one band of the electromagnetic spectrum. For example, the decorative layer 26, in paint examples, may provide a perceived color to an onlooker by reflecting a portion (e.g., a specific color) of the visible band of the electromagnetic spectrum. The reflected portion of the electromagnetic band may be due to one or more pigments (e.g., the additives 26A) disposed within a resinous binder. Exemplary compositions of pigments may include Perylene compounds such as Paliogen® and Lumogen®. The inclusion of one or more flakes and particles (e.g., the additives 26A) may provide a metallic reflection and/or scattering of incident light on the decorative layer 26. The flakes and/or particles may be composed of metals (e.g., aluminum, steel, etc.) to provide an iridescent or sparkling appearance.

According to various examples, the additives 26A within the decorative layer 26 may be configured to interact (e.g., transmit, absorb, and/or reflect) one or more bands of the electromagnetic spectrum. Further, multiple different additives 26A may be used, not all of which may interact with the same bands of the electromagnetic spectrum. Further, the additives 26A may be configured to interact differently with different wavelength bands of the electromagnetic spectrum than the detectable layer 22 and/or the top layer 30. For example, the additives 26A may be configured to reflect a first band of the electromagnetic spectrum (e.g., visible light) while remaining transparent to a second band of the electromagnetic spectrum (e.g., near infrared and/or infrared light). The additives 26A may have a transparency to near infrared and/or infrared light of greater than about 10%, 20%, 30%, 40%, 50%, 60%, 70%, 80%, 90%, or greater than about 99%. The additives 26A may reflect greater than about 10%, 20%, 30%, 40%, 50%, 60%, 70%, 80%, 90%, or greater than about 99% of visible light or specific bands (e.g., colors) of the visible light.

The detectable layer 22 is positioned between the exterior surface 18B of the substrate 18 and the decorative layer 26. One or more adhesion layers may be positioned between the decorative layer 26 and the detectable layer 22, or between the detectable layer 22 and the exterior surface 18B, to facilitate or increase adhesion. The detectable layer 22 is configured to interact (e.g., reflect, fluoresce, absorb, transmit) with one or more wavelength bands of the electromagnetic spectrum. According to one example, the detectable layer 22 is configured to allow detection of the vehicle 10 by LIDAR systems by reflecting and/or emitting light having a wavelength detectable by the LIDAR systems. According to various examples, the detectable layer 22 is configured to reflect, absorb and/or fluoresce light in the infrared band (e.g., light having a wavelength of between about 700 nm to about 1 mm) of the electromagnetic spectrum, and more particularly, the near infrared band (e.g., light having a wavelength of between about 700 nm to about 1550 nm). LIDAR systems may utilize lasers or light emission sources which emit light having a wavelength of about 905 and/or 1550 nm. In reflective examples of the detectable layer 22, the detectable layer 22 may be configured to reflect equal to or greater than about 10%, 20%, 30%, 40%, 50%, 60%, 70%, 80%, 90% or 99% of light (e.g., of the near-infrared band) falling on the detectable layer 22. The detectable layer 22 may be partially, substantially or fully transparent to light within the visible wavelength band of light (e.g., light having a wavelength of between about 390 nm to about 700 nm). For example, the detectable layer 22 may have a transparency to light in the visible wavelength band equal to or greater than about 10%, 20%, 30%, 40%, 50%, 60%, 70%, 80%, 90% or 99%. Alternatively, the detectable layer 22 may be configured to reflect and/or absorb greater than about 10%, 20%, 30%, 40%, 50%, 60%, 70%, 80%, 90% or 99% of visible light. The detectable layer 22 may have a thickness of between about 12 μm and about 75 μm, or between about 25 μm and about 50 μm.

The detectable layer 22 may be positioned and/or applied on the exterior surface 18B of the substrate 18 in a variety of manners. For example, the detectable layer 22 may be applied as a coating, film, additional substrate, veneer, glaze, layer and/or covering without departing from the spirit of this disclosure. The detectable layer 22 may fully cover the substrate 18, or may be applied in a striped, stippled or other pattern. Further, the type of application may change across a body panel 14 and from body panel 14 to body panel 14. The composition, application method and/or thickness (e.g., and therefore the level of interaction with bands of the electromagnetic spectrum) of the detectable layer 22 may vary across the detectable layer 22. For example, the composition, application method and/or thickness of the detectable layer 22 may be altered to form an indicium 80 or multiple indicia 80. In a first example, the detectable layer 22 may be applied or laid down (e.g., though an ink jet process, pad printing, screen printing, etc.) on the exterior surface 18B in the shape or form of the indicium 80. For example, stripes of the detectable layer 22, separated by portions of the exterior surface 18B not including the detectable layer 22, may form the indicium 80. In another example, the detectable layer 22 may be applied such that the detectable layer 22 includes a first portion 22A and a second portion 22B. The first and second portions 22A, 22B may cooperate to form the indicium 80. The indicium 80 may cover a portion, or the entire body panel 14. The first and second portions 22A, 22B may differ in thickness, composition, application method and/or any other manner which may affect the interaction with the electromagnetic spectrum. For example, the second portion 22B may have a higher reflectivity to near-infrared and/or infrared bands of the electromagnetic spectrum as compared to the first portion 22A. As such, the detectable layer 22, utilizing the first and second portions 22A, 22B may form the indicium 80 as only visible to a sensing system (e.g., LIDAR) and not to un-aided persons viewing the body panel 14. The indicium 80 may be alphanumeric text, pictures, symbols, patterns, stippling, striping, numbers, machine readable codes (e.g., bar codes, QR codes, etc.), or other indicium 80 configured to confer information. For example, the indicium 80 may indicate the position of the substrate 18 on the vehicle 10. Such a use may be advantageous in allowing LIDAR systems to quickly determine which portion of the vehicle 10 is being sensed.

Figure 3A:
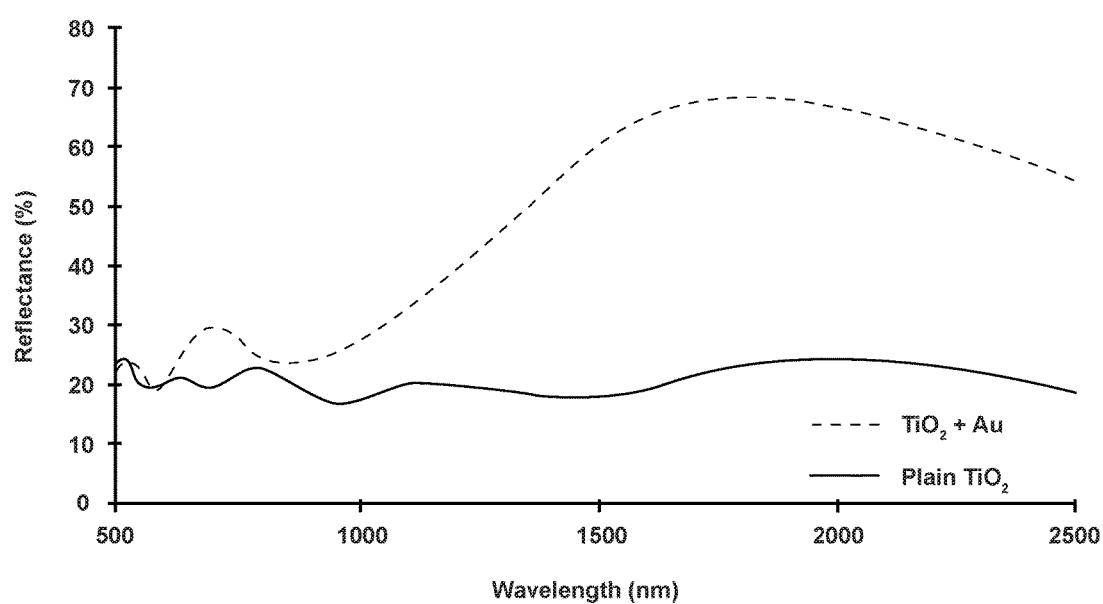
FIG. 3A is a graph depicting reflectance vs. wavelength for $TiO_2$ and gold doped $TiO_2$.

According to a first reflective example of the detectable layer 22, the detectable layer 22 is configured as a plurality of particles (e.g., a reflective component) or pigments disposed in a coating or binder. The particles or pigments may be configured to selectively reflect radiation at one wavelength, but may be transparent at other wavelengths as explained above. The particles may include a dielectric material. In a specific example, the dielectric particles may include $TiO_2$. According to some examples, the dielectric particles may include one or more dopants disposed within a matrix of the dielectric particles. The dopants may include metals such as gold, niobium, copper or combinations thereof. The dopants may be present within the dielectric particles at a concentration of less than about 5%, 4%, 3%, 2%, 1% or less than about 0.1%. Use of the dopants within the dielectric particles may increase the reflectivity of the dielectric particles at 1550 nm from about 30% to 65%. For example, FIG. 3A, depicts the reflectance vs. wavelength of undoped $TiO_2$ sample and a gold doped $TiO_2$ sample (e.g., the detectable layer 22). As can be seen, the reflectivity of the gold doped $TiO_2$ sample is increased relative to that of the undoped sample. The particles may have a volume fraction within the binder of between about 0.5% and about 20%, or between about 1% and about 10%, or between about 4% and about 6%. In a specific example, the particles may have a volume fraction within the binder of about 5%.

According to a second reflective example of the detectable layer 22, the detectable layer 22 may include a stack of thin layers of materials with different refractive indices (e.g., a high refractive index material and a low refractive index material) on top of each other (e.g., a first material layer and a second material layer). In a specific example, the thin layers of material may be dielectrics. The thin layers of material may be arranged in a dielectric stack (i.e., a grouping of the first and second material layers based on physical properties). The detectable layer 22 may have one, two or more stacks of the first and second dielectric layers, each stack varying properties such as thickness and refractive index of the layers. This example of the detectable layer 22 may be referred to as a dielectric mirror. Using such an example, the wavelength at which the detectable layer 22 is reflective can be tuned by varying the thickness and composition of the alternating layers of high and low refractive index materials. The sharpness of the reflectivity window (i.e., a wavelength band at which the detectable layer 22 is reflective) can be controlled by the number of layers present in the detectable layer 22. Exemplary dielectric materials include $SiO_2$, $Ta_2O_5$, $NbO_5$, $TiO_2$, $HfO_2$, $MgF_2$ and combinations thereof. The thickness of the dielectric layers may each be between about 5 nm and about 200 nm. In some examples, the thickness of the dielectric layers may be different than one another and may vary. In some examples, the choice of which dielectric material to use may be based on the refractive index of the material in order to increase or decrease the reflectivity of the detectable layer 22. In various examples, high refractive index materials may have indices greater than about 1.9, greater than about 2.1, or greater than about 2.4. In various examples, low index of refraction materials may have refractive indices of less than about 1.5, less than about 1.4, or less than about 1.3. Examples of the detectable layer 22 utilizing dielectric mirrors may include a scattering structure (e.g., a roughening of the top layer 30, scattering particles in the detectable layer 22 and/or decorative layer 26, etc.) configured to diffusely reflect various wavelengths and minimize specular reflection.

Figure 3B:
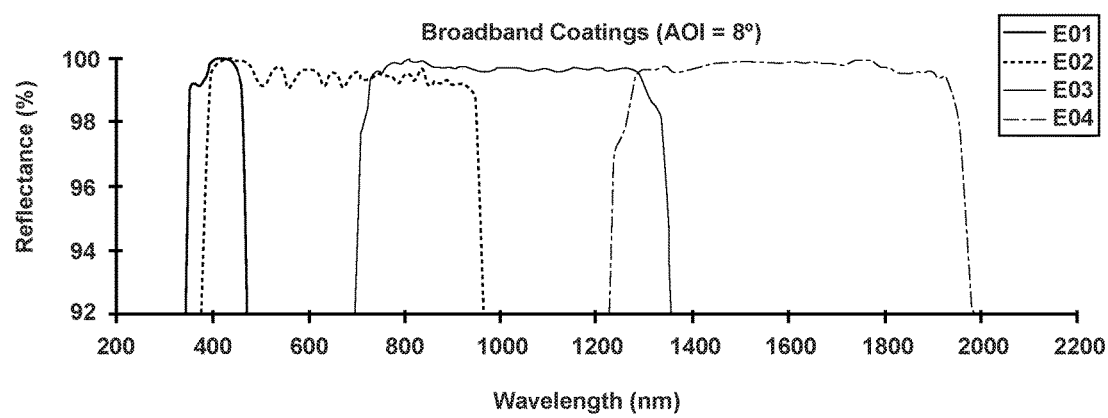
FIG. 3B is a graph depicting reflectance vs. wavelength for a reflective example of a detectable layer, according to one example.
Figure 4A:
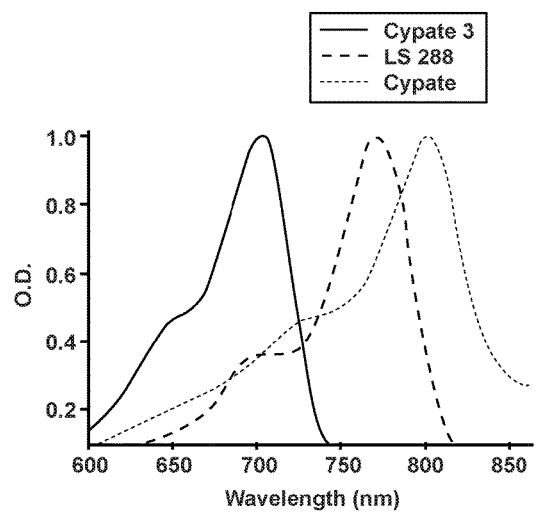
FIG. 4A is a graph depicting a wavelength vs. intensity for an excitation source.
Figure 4B:
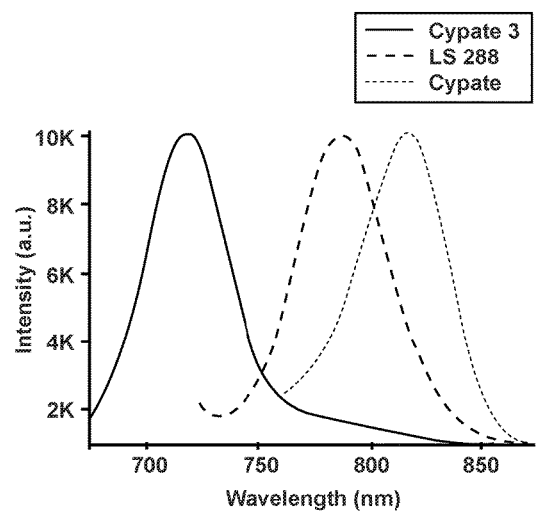
FIG. 4B is a graph depicting the intensity of a fluorescence from a detectable layer when illuminated with the excitation source.

In examples of the detectable layer 22 utilizing the alternating stack of high and low refractive index materials, the stack of high and low refractive index materials may be configured as a plurality of particles (e.g., the reflective component) disposed within a binder, as explained above in connection with the first example of the detectable layer 22. The stacks of alternating thin layers of materials with different refractive indices may be formed by thin film deposition. The stacks can be deposited by pyrolytic vapor deposition, chemical vapor deposition, sputtering or layer-by-layer (LBL) deposition. The stacks of alternating thin layers of materials may be produced by creating the thin films on flexible substrates, releasing the films from the substrate, and grinding the material into small flakes or particles for dispersion in binders and coatings, as explained above in connection with the first example of the detectable layer 22. The particles may have a volume fraction within the binder of between about 0.5% and about 20%, or between about 1% and about 10%, or between about 4% and about 6%. In a specific example, the particles may have a volume fraction within the binder of about 5%. As shown in FIG. 3B, the detectable layer 22 utilizing the stacks of alternating materials may be configured to reflect certain windows of the electromagnetic spectrum while being substantially transparent to other windows or bands. In specific examples, the detectable layer 22 utilizing such particles may selectively reflect light having a wavelength of about 905 nm or about 1550 nm (e.g., near-infrared radiation) to enhance reflectivity at wavelengths traditionally utilized by LIDAR systems.

According to another example, the detectable layer 22 may be configured to fluoresce at a predetermined wavelength in response to receiving an excitation emission. In such an example, the detectable layer 22 may include a binder and one or more types of organic molecules (e.g., a fluorescent component) with a structure configured to fluoresce when illuminated with specific wavelengths of light. According to various examples, the organic molecules may be based on a cyanine structure such as Cypate (e.g., a cyanine component). It will be understood that other molecules and dyes capable of excitation and emission may be utilized without departing from the teachings provided herein. The excitation emission may have a wavelength in the ultraviolet, visible, near-infrared or infrared wavebands of the electromagnetic spectrum. In specific examples, the excitation emission may be of a wavelength used by LIDAR systems such as about 905 nm and/or about 1550 nm. In response to the excitation emission, the organic molecules may be configured to down convert the excitation emission into a longer wavelength emission. In a specific example, the organic molecules of the detectable layer 22 may be configured to be excited by an excitation emission from a LIDAR system and configured to emit light which is also perceptible by the LIDAR system (e.g., the organic molecules may fluoresce light in the near-infrared band). It will be understood that the reflective and fluorescent examples of the detectable layer 22 may be combined without departing from the teaching provided herein.

Use of the present disclosure may offer several advantages. First, enhanced reflectivity of the vehicle 10 to LIDAR systems may provide safety benefits. For example, the increased reflectivity may enhance the "visibility" of the vehicle 10 to autonomous vehicles, automated system and other system incorporating LIDAR systems. Further, examples of the vehicle 10 which have a small visible area, such as a motor cycle, may have improved visibility to autonomous vehicles. Second, as the decorative layer 26 may be transparent or translucent to infrared and/or near-infrared light, the decorative layer 26 may be positioned over the detectable layer 22. Such examples may be advantageous in allowing an owner of the vehicle 10 to choose any color for the vehicle 10, while still allowing the vehicle 10 to be visible to LIDAR sensors. Third, the ability to place the detectable layer 22 across multiple body panels 14 of the vehicle 10 may increase the visibility of the vehicle 10 to LIDAR systems. Fourth, by configuring the detectable layer 22 as the indicium 80, the detectable layer 22 may do more than just reflect light, but rather convey spatial information about what the LIDAR system is sensing.

It will be understood that although described in connection with vehicular components, the present disclosure may be equally applied to non-automotive components. For example, the detectable layer 22 and the decorative layer 26 of the present disclosure may be applied to signs, clothing, bicycles, hats, personal protective equipment, children's toys, pet leashes and harnesses, etc., without departing from the teachings provided herein. While the foregoing disclosure may be advantageous in allowing LIDAR systems to detect vehicles, application of the detectable layer 22 to the above enumerated items may allow for the detection of common road hazards (e.g., people, pets, bikers) by automated vehicles utilizing LIDAR detection systems.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle body panel, comprising:
 a substrate defining an exterior surface;
 a detectable layer positioned on the exterior surface and configured to interact with a first band of an electromagnetic spectrum, wherein the detectable layer has a thickness of from about 12 μm to about 75 μm;
 a decorative layer positioned on the detectable layer and configured to reflect a portion of a second band of the electromagnetic spectrum and transmit the first band of the electromagnetic spectrum; and
 a top layer positioned on the decorative layer and configured to transmit the first and second bands of the electromagnetic spectrum.

2. The vehicle body panel of claim 1, wherein the detectable layer has a thickness of between about 25 μm and about 50 μm.

3. The vehicle body panel of claim 1, wherein the decorative layer has a thickness of between about 10 μm and about 30 μm.

4. The vehicle body panel of claim 1, wherein the decorative layer comprises at least one of a pigment and a plurality of flakes.

5. The vehicle body panel of claim 4, wherein the at least one of a pigment and plurality of flakes are substantially transparent to an infrared band and near-infrared band of the electromagnetic spectrum.

6. The vehicle body panel of claim 1, wherein the detectable layer is configured to receive an excitation emission and fluoresce in response to the excitation emission in a longer wavelength than the excitation emission.

7. The vehicle body panel of claim 6, wherein the excitation emission has a wavelength between about 700 nm and about 1600 nm and the detectable layer comprises a cyanine component.

8. The vehicle body panel of claim 1, wherein the detectable layer defines an indicium.

9. A vehicle body panel, comprising:
 a detectable layer positioned on a substrate and configured to reflect a band of an electromagnetic spectrum wherein the detectable layer comprises at least one of (i) a dielectric and a metal and (ii) a stack of alternating refractive index materials; and
 a decorative layer comprising a pigment and positioned on the detectable layer,
 wherein the decorative layer and the pigment are configured to transmit the band of the electromagnetic spectrum.

10. The vehicle body panel of claim 9, wherein the dielectric material comprises $TiO_2$ and the metal is a dopant disposed within a matrix of the dielectric material.

11. The vehicle body panel of claim 10, wherein the metal comprises at least one of gold, niobium and copper.

12. The vehicle body panel of claim 11, wherein the dielectric material comprises at least one of $SiO_2$, $TiO_2$ and $MgF_2$.

13. A vehicle comprising:
 a detectable layer configured as an indicium and positioned on a substrate, wherein the detectable layer is configured to reflect a non-visible band of the electromagnetic spectrum and comprises a dielectric material and a metal; and
 a decorative layer positioned over the detectable layer and configured to transmit the non-visible band of the electromagnetic spectrum.

14. The vehicle of claim 13, wherein the indicium indicates a position of the substrate on the vehicle.

15. The vehicle of claim 14, wherein the non-visible band of the electromagnetic spectrum is at least one of a near-infrared band and an infrared band.

16. The vehicle of claim 13, wherein the dielectric material comprises at least one of $SiO_2$, $TiO_2$ and $MgF_2$ and the metal comprises at least one of gold, niobium and copper.

* * * * *